Nov. 3, 1970   C. W. SNYDER, JR., ET AL   3,537,905
FUEL CELL UNIT LIQUID ELECTROLYTE CONDITIONER AND METHOD
Filed May 9, 1968

INVENTORS:
ARNOLD D. THUMIM,
CHARLES W. SNYDER, JR.
ALBERT C. ERICKSON,

BY Carl O. Thomas
THEIR ATTORNEY.

United States Patent Office 3,537,905
Patented Nov. 3, 1970

3,537,905
FUEL CELL UNIT LIQUID ELECTROLYTE CONDITIONER AND METHOD
Charles W. Snyder, Jr., Beverly, Arnold D. Thumim, Brighton, and Albert C. Erickson, Wakefield, Mass., assignors to Gesellschaft fur Elektrometallurgie m.b.H., Dusseldorf, Germany
Filed May 9, 1968, Ser. No. 727,873
Int. Cl. H01m 27/14, 31/00
U.S. Cl. 136—86       7 Claims

ABSTRACT OF THE DISCLOSURE

A storage tank for liquid electrolyte is provided which contains excess electrolyte during operation of a fuel cell and acts as a storage tank for electrolyte when the fuel cell is shut down. Steam is used to heat the electrolyte, and incoming fuel is bubbled through the electrolyte both to achieve humidification and heat transfer.

BACKGROUND OF THE INVENTION

The construction and use of fluid consuming cell units having circulating liquid electrolytes is well known in the art of electrical power generation. The cell units may be comprised of a single cell or a battery of electrically related cells. The cells are referred to as fluid consuming cells since an externally supplied fluid reactant is electrochemically oxidized or reduced at one electrode. The circulating liquid electrolyte is usually an alkali, such as potassium hydroxide, or an acid, such as sulfuric or phosphoric acid. In the most widely utilized type of fluid consuming cell units, fuel cell units, an oxidizable fluid reactant is supplied to one electrode while a reducible fluid reactant is simultaneously supplied to the counter electrode. Thus, fuel cell units frequently utilize hydrogen, ammonia, fluid hydrocarbons, alcohols, steam reformed or thermally or catalytically cracked hydrocarbons or alcohols, etc., as externally supplied anode reactants and oxygen or air as externally supplied cathode reactants. It is, of course, recognized that a varied form of fluid consuming cell may be formed by substituting for the anode or cathode of a fuel cell a conventional primary or secondary electrode. Metal-air cells represent a practical example of this category of fluid consuming cells. Metal-air cells are so designated, since the anode is typically a primary or secondary electrode of a conventional battery electrode metal, such as magnesium, zinc, aluminum, cadmium, lead, etc., while the cathode corresponds to an air cathode incorporated in a fuel cell unit.

The purpose of circulating a liquid electrolyte through a fluid consuming cell is to remove the heat produced in the cell through internal resistive losses and to insure that gas pockets do not develop within the electrolyte chamber of the cells, thereby destroying ionic conductivity between the electrodes of the cell. A number of problems have been encountered with circulating electrolyte systems. One disadvantage is that electrolytes of desired concentration for operating conditions are frequently too viscous to be pumped on start up. Another disadvantage is that liquid electrolyte systems frequently make no specific provision for storage of electrolyte when the system is not in use, except within the cell unit. Upon standing in a cell for a period of time an electrolyte will frequently penetrate the pores of the electrodes with which it is in contact. This can result in electrolyte leakage into the reactant chambers of the cells and total or partial electrode inactivation by flooding. Another disadvantage that is encountered is that a large proportion of the water content of the electrolyte is lost to the fluid reactant passing therethrough requiring continual monitoring and adjustment of the electrolyte concentration.

BRIEF SUMMARY OF THE INVENTION

It is an object of our invention to provide a system and process for more effectively conditioning a circulating liquid electrolyte for a fluid consuming cell unit.

This and other objects of our invention may be accomplished according to one aspect of our invention by providing a process of generating electrical energy comprised of steps of circulating a liquid electrolyte between a fluid consuming cell unit and an external electrolyte storage zone, circulating a hot fluid reactant stream through the liquid electrolyte contained within the external storage zone to humidify and cool the fluid reactant and to heat the liquid electrolyte, circulating the fluid reactant stream through the fluid consuming cell unit, separating water from the fluid reactant leaving the fluid consuming cell, entraining a portion of the separated water in the liquid electrolyte for delivery to the external storage zone, and withdrawing electrical power from the fluid consuming cell unit.

According to another aspect our invention is directed to a system for generating electrical energy comprising a fluid consuming cell unit provided with a liquid electrolyte. Electrolyte conditioning means are provided including sump means for storing a body of liquid electrolyte and means for introducing water to maintain the electrolyte within the sump means above a predetermined level. Means are provided for circulating the liquid electrolyte between the conditioning means and the fluid consuming cell as well as for introducing a hot fluid stream into the conditioning means in direct heat transfer relation with the liquid electrolyte with the sump means. Means are provided for directing the fluid stream from the conditioning means to the fluid consuming cell unit. Means are provided for separating water from the fluid reactant stream leaving the fluid consuming cell unit, and means are provided for returning at least a portion of the separated water to the conditioning means.

BRIEF DESCRIPTION OF THE DRAWINGS

Our invention may be better understod by reference to the following detailed description considered in conjunction with the drawings, in which.

DETAILED DESCRIPTION OF THE INVENTION

Figure 1:
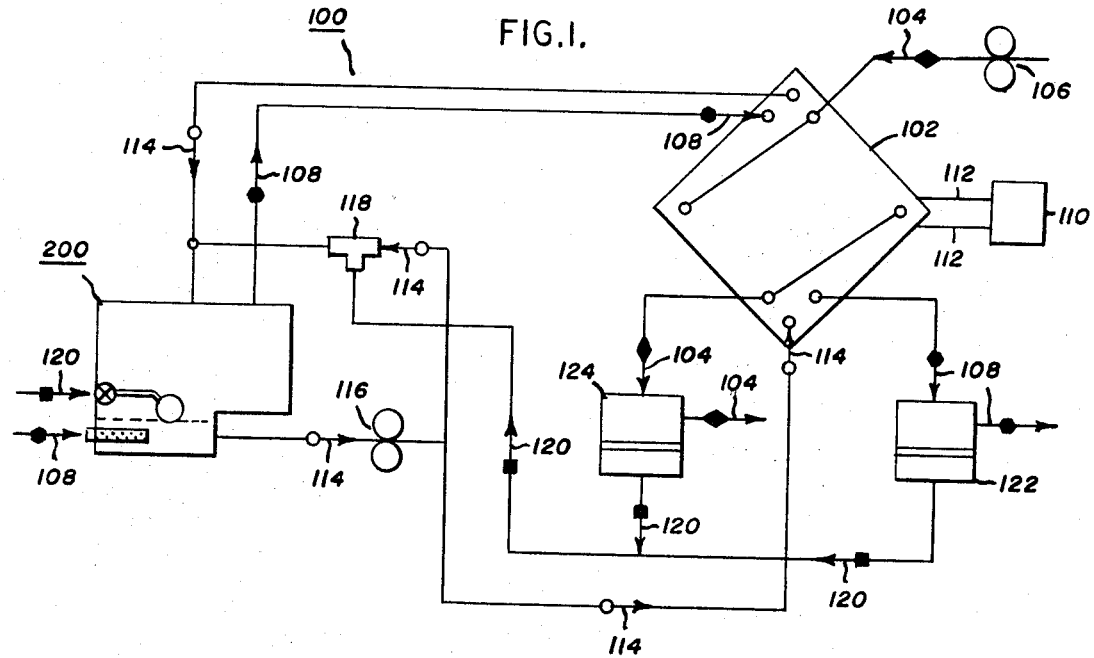
FIG. 1 is a schematic diagram of an electrolyte conditioning system and FIG. 2 is a vertical sectional view of an electrolyte conditioner.

In FIG. 1 a system 100 is schematically illustrated for generating electrical power. A fuel cell unit 102 is supplied with air as a first fluid reactant stream, indicated by flow arrows 104, through the use of compressor 106. A fuel is supplied to the fuel cell unit as a second fluid reactant stream, indicated by flow arrows 108. The fuel stream is received from the electrolyte conditioner 200. The fuel cell unit is connected to an electrical load 110 by electrical leads 112. Liquid electrolyte, indicated by flow arrows 114, is directed by pump 116 from the electrolyte conditioner to the fuel cell unit and from the fuel cell unit back to the electrolyte conditioner. A portion of the electrolyte stream by-passes the fuel cell unit and passes through an aspirator pump 118. The aspirator pump entrains water, indicated by flow arrows 120, from a fuel stream scrubber 122 and an air stream scrubber 124. The fuel and air stream scrubbers continuously separate water from the fuel and air streams leaving the fuel cell unit. It is anticipated that liquid electrolyte may be present in the water scrubbed from the fuel and air streams.

With the exception of the electrolyte conditioner, the various elements of the system are per se of conventional construction. The fuel cell unit is preferably constructed as disclosed by Thumim in patent application Ser. No. 727,789, filed concurrently with this application, titled Electrode and Cell Constructions for Improved Sealing and Edge Current Collection; Thumim and Snyder in patent application Ser. No. 727,790, filed concurrently with this application, titled Fuel Cell Unit with Novel Fluid Confining and Directing Features; and Erickson in patent application Ser. No. 728,164, filed concurrently with this application, titled Fuel Cell Unit with Novel Fluid Distribution, Drain, and Vent Features. The disclosures of these three patent applications are here incorporated by reference. It is appreciated that while these fuel cell units are preferred for utilization, any conventional fuel cell unit having a circulating liquid electrolyte may be utilized. In conjunction with the fuel cell unit any conventional type of pump, aspirator, or scrubber may be employed.

Figure 2:
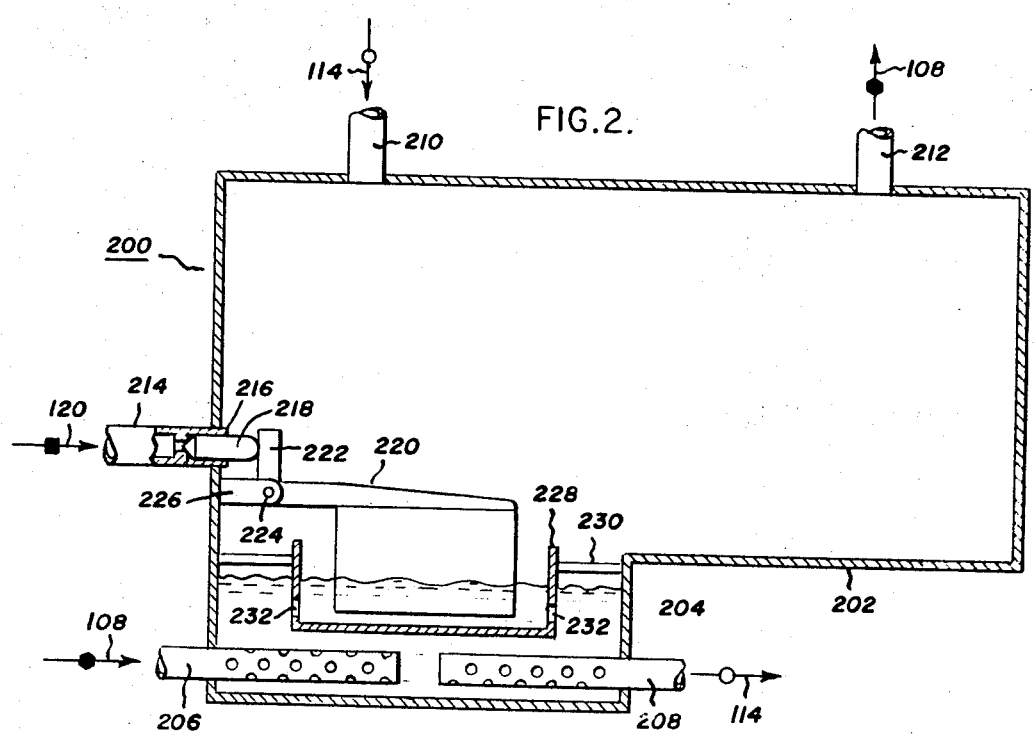

The electrolyte conditioner is shown in detail in FIG. 2. The conditioner is comprised of a housing 202 having a sump portion 204. A sparger 206 is sealingly fitted to lie within the sump portion as is an electrolyte outlet pipe 208. Electrolyte inlet conduit 210 is connected to the upper portion of the housing, and fluid reactant outlet conduit 212 is also connected to the upper portion of the housing. A water inlet conduit 214 is provided with a valve seat element 216. A valve pin 218 cooperates with the valve seat element to control flow of water through the water inlet conduit. A float 220 is provided with a heel 222 that cooperates with the valve pin as it pivots about pin 224 carried by the mounting arm 226 affixed to the inside wall of the housing. A turbulence baffle 228 is mounted by arms 230 so as to protect the float from the turbulence produced by the sparger. Ports 232 are provided in the baffle to equalize the electrolyte level interiorly and exteriorly thereof.

Initially no electrolyte is present within the fuel cell unit 102, but is located entirely within the electrolyte conditioner 200. Since the electrolyte may be quite viscuous and difficult to circulate at ambient temperatures, it is preferred to initially introduce steam through the sparger 206 to heat the electrolyte. The steam may be diverted from the system after passing through the electrolyte conditioner by providing a suitable bleed valve in the fuel outlet conduit 212, not shown. As shown, the steam passes through the fuel cell unit and is removed from the system through scrubber 122. Whether or not any substantial amount of steam is condensed in the scrubber and returned to the electrolyte conditioner will depend in large measure upon the amount of superheat initially present in the steam. The steam performs the useful function of purging air from the fuel spaces within the fuel cell unit.

Once the electrolyte is heated sufficiently to be readily pumpable through the system, the pump 116 is actuated and a fuel substituted for steam supplied to the sparger. At the same time the compressor 106 is activated to supply the fuel cell unit with an air stream. At any time after this the fuel cell unit may supply electrical power to an external electrical load on demand.

The purpose of circulating the electrolyte is to insure that gas pockets do not build up with the electrolyte zones within the fuel cell unit. Any gases entrained within the electrolyte that may have a tendency to separate out or be swept through the fuel cell unit so that no portion of the fuel cell electrodes are inactivated for contact with the electrolyte. The electrolyte also serves the important function of carrying out of the fuel cell unit heat generated through internal resistive power losses. Circulation of the electrolyte also serves to insure that differences in electrolyte concentration do not develop between the various cells of the fuel cell unit causing some to become more highly heated than others, which, if unchecked, can lead to cell failure.

By scrubbing out at least a portion of the water entrained in the effluent fuel and air streams leaving the fuel cell unit, the need for adding additional water to the system to maintain the concentration of the electrolyte at the desired level can be minimized. To provide additional water to the system and thereby maintain the electrolyte level above a predetermined minimum within the sump portion of the housing, the float 220 is provided controlling flow of water into the housing through the valve seat element 216. When the electrolyte level within the sump portion is above a predetermined minimum level, the float pivots the heel 222 into engagement with the valve pin 218 to prevent water from entering the conditioner housing. The turbulence baffle surrounds the float so that the electrolyte immediatley adjacent to the float remains quiescent and unaffected by the agitating function of the sparger. Instead of using a float controlled valve, it is anticipated that the water inlet valve may be controlled by a conductivity cell, photocell cell, or other conventional water level control valves.

If the fuel reactant enters the electrolyte conditioner at a lower sensible temperature than the electrolyte, it will cool the electrolyte in passing through the sparger and electrolyte conditioner housing. A cooling effect can also be gained by evaporation of some portion of the water content of the electrolyte if the fuel is initially introduced in a relatively dry condition.

In a specific embodiment of the system illustrated and described 3 N sulfuric acid was utilized as an electrolyte, air utilized as an oxidant stream, and a reformate produced by steam reforming a hydrocarbon was utilized as a fuel stream. The reformate was supplied to the system at approximately the same temperature as the electrolyte. The temperature of the reformate was controlled by preliminarily diverting a portion of the reformate and condensing water therefrom. The air and fuel leaving the system through the scrubbers was fed to a burner and combusted to produce heat to drive the reforming reaction. The combustion products were subsequently cooled with a portion of the water condensation made available to the system through the water inlet conduit 214. In this manner the system was made self-sufficient as to water, so that only fuel had to be supplied from outside the system. Using sulfuric acid as an electrolyte as described, the system was run at operating temperatures in the range of from 160 to 175° F. If phosphoric acid were substituted for sulfuric acid, it is appreciated that the system could be easily run at temperatures up to 375° F. The system could, of course, be readily utilized with any liquid electrolyte, the control of the temperature at any desired level of operating being easily accomplished.

The fuel and air stream scrubbers are particularly advantageous in our system, since they function to prevent any significant portion of the electrolyte from being removed from the system. Absent the scrubbers electrolyte is lost from the system in the effluent fuel and air streams. This requires periodic make-up of the electrolyte lost. Where the fuel and air effluent streams are to be directed to a burner or other end use a corrosion problem is produced by the entrained electrolyte, since liquid electrolytes for fuel cells are characteristically either strong acids or strong bases. In fuel cell systems where electrolyte loss through entrainment in the fuel and/or air streams is not deemed to constitute any problem, the scrubbers and aspirators and their function could be readily omitted.

While our system is disclosed with specific reference to a fuel cell unit, it is readily appreciated that it extends to any fluid consuming cell having a circulating liquid electrolyte. For example, the system 100 could be easily adapted for use with a metal-air cell having a circulating fluid electrolyte merely by introducing air through the sparger and eliminating the compressor 106 and scrubber 104 and their function. The electrolyte conditioner could itself be varied considerably without departing from our teachings. For example, one inlet conduit could be used for steam and another for fuel, instead of using the same inlet sequentially. Instead of using a float valve the water inlet could be controlled by using a manual valve and a sight glass in combination or ony other equivalent liquid level controller. The housing may be provided with heat dissipation fins if desired or wholly or partially thermally insulated, depending upon the temperature demands of the specific application.

While we have described our invention with reference to a specific embodiment, it is appreciated that numerous variations will readily occur to those skilled in the art. It is accordingly intended that the scope of our invention be determined by reference to the following claims.

What we claim and desire to secure by Letters Patent of the United States is:

1. A process of generating electrical energy comprising:
    circulating a liquid electrolyte between a fluid consuming cell unit and an external electrolyte storage zone,
    circulating a hot fluid reactant stream through the liquid electrolyte contained within the external storage zone to humidify and cool the fluid reactant and to heat the liquid electrolyte,
    circulating the fluid reactant stream through the fluid consuming cell unit,
    separating water from the fluid reactant stream leaving the fluid consuming cell unit,
    entraining a portion of the separated water in the liquid electrolyte for delivery to the external storage zone, and
    withdrawing electrical power from the fluid consuming cell unit.

2. A process according to claim 1 including the additional step of draining the electrolyte from the fluid consuming cell unit into the external storage zone before allowing the cell unit to cool to ambient temperature.

3. A process according to claim 1 including the additional step of circulating steam through the electrolyte within the external storage zone prior to circulating the fluid reactant stream.

4. A process according to claim 1 in which the fluid reactant stream leaving the fluid consuming cell unit contains a reactant combustible to yield water and including the additional steps of combusting the reactant, condensing the water formed as a reaction product, and delivering the water to the electrolyte storage zone.

5. A process according to claim 1 in which the fluid consuming cell unit is a fuel cell unit and including the additional step of circulating a second fluid reactant stream to the fuel cell unit.

6. A process according to claim 5 in which the first and second reactant streams leaving the fuel cell unit are combusted, water is condensed from the combustion products, and at least a portion of the condensed water is delivered to the external storage zone.

7. A system for generating electrical energy comprising:
    a fluid consuming cell unit provided with a liquid electrolyte,
    electrolyte conditioning means including sump means for storing a body of liquid electrolyte and
    means for introducing water to maintain the electrolyte within said sump means above a predetermined level,
    means for circulating the liquid electrolyte between said conditioning means and said fluid consuming cell,
    means for introducing a hot fluid stream into said conditioning means in direct heat transfer relation with the liquid electrolyte within said sump means,
    means for directing the fluid stream from said conditioning means to said fluid consuming cell unit,
    means for separating water from the fluid reactant stream leaving said fluid consuming cell unit, and
    means for returning at least a portion of the separated water to said conditioning means.

References Cited

UNITED STATES PATENTS

| | | | |
|---|---|---|---|
| 3,002,039 | 9/1961 | Bacon | 136—86 |
| 3,112,228 | 11/1963 | Young | 136—86 |
| 3,359,136 | 12/1967 | Merten et al. | 136—86 |
| 3,411,951 | 11/1968 | Gelting | 136—86 |
| 3,455,743 | 7/1969 | Huebscher et al. | 136—86 |
| 3,457,114 | 7/1969 | Wedin | 136—86 |

ALLEN B. CURTIS, Primary Examiner

U.S. Cl. X.R.

136—161

UNITED STATES PATENT OFFICE
CERTIFICATE OF CORRECTION

Patent No. 3,537,905                    Dated November 3, 1970

Inventor(s) Charles W. Snyder, Jr. et al

It is certified that error appears in the above-identified patent and that said Letters Patent are hereby corrected as shown below:

In the heading to the printed specification, lines 2-5

"assignors to Gesellschaft fur Elektrometallurgie m.b.H., Dusseldorf, Germany"

should read

"assignors to General Electric Company, A Corporation of New York"

Signed and sealed this 8th day of June 1971.

(SEAL)
Attest:

EDWARD M. FLETCHER, JR.
Attesting Officer

WILLIAM E. SCHUYLER, JR.
Commissioner of Patents